July 18, 1939.                D. D. GOLDBERG                2,166,840
                        VALVE OPERATING MECHANISM
                    Filed Feb. 14, 1938         2 Sheets-Sheet 1
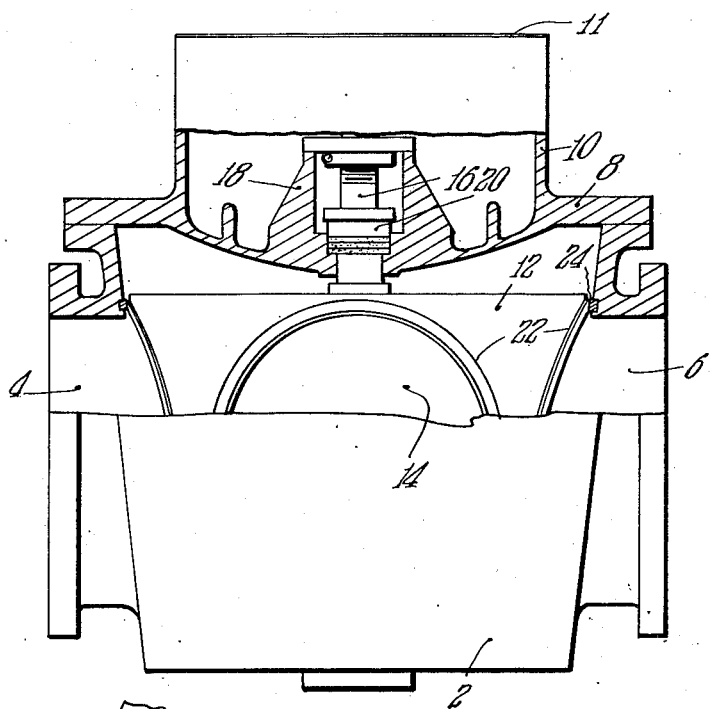
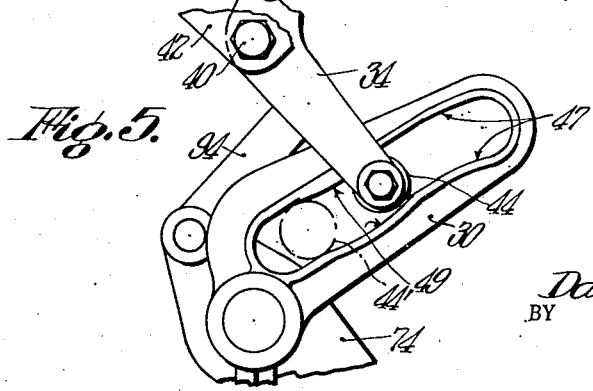
INVENTOR.
David D. Goldberg.
BY Walter C. Ross.
ATTORNEY.

July 18, 1939.  D. D. GOLDBERG  2,166,840
VALVE OPERATING MECHANISM
Filed Feb. 14, 1938  2 Sheets-Sheet 2
Fig. 2.
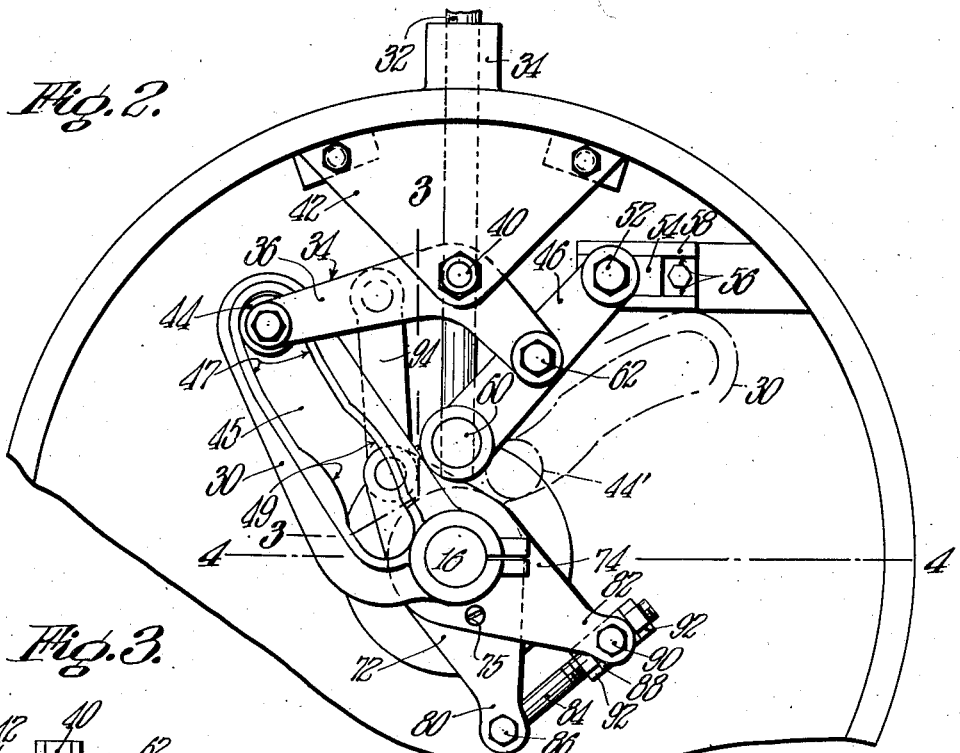
Fig. 3.
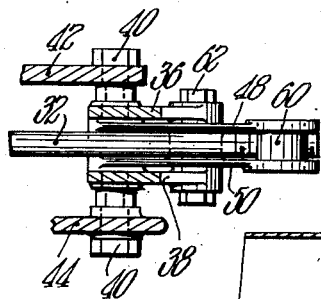
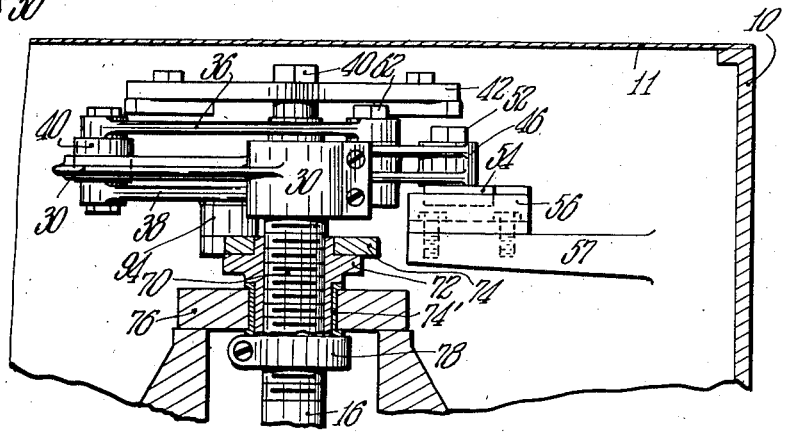
Fig. 4.
INVENTOR.
David D. Goldberg.
BY
ATTORNEY.

Patented July 18, 1939

2,166,840

UNITED STATES PATENT OFFICE 2,166,840

VALVE OPERATING MECHANISM

David D. Goldberg, Springfield, Mass., assignor to Chapman Valve Manufacturing Company, Indian Orchard, Mass., a corporation of Massachusetts Application February 14, 1938, Serial No. 190,453

12 Claims. (Cl. 74—22)

This invention relates to improvements in valve apparatus and is directed more particularly to novel operating mechanism for valve apparatus.

The principal objects of this invention are directed to the provision of novel valve operating apparatus adapted among other purposes for actuating the cone plug or valve member of a cone plug valve.

The cone plug of a cone plug valve is mounted for reciprocating and rotating movements, and is unseated or moved axially from off its seat and rotated from open or closed position to closed or open position and is then reseated or moved axially onto its seat again.

The novel operating mechanism of the invention is adapted to provide the desired reciprocating and rotating movements of the cone plug in their proper timed relation and according to a special feature of the invention the mechanism is characterized by its simplicity in form and efficiency in operation which is accomplished in part by the provision of mechanism adapted for straight line movements, all as will hereinafter more fully appear.

Various novel features and advantages of the invention will be hereinafter referred to in connection with the accompanying description of the invention in its preferred form it being understood that various changes and modifications may be made to adapt the mechanism to various conditions, without departing from the spirit and scope of the invention.

In the drawings:

Fig. 1 is a side elevational view of a cone valve apparatus with parts thereof in section;

Fig. 2 is a somewhat enlarged plan view of the operating mechanism of the invention;

Fig. 3 is a sectional elevational view on the line 3—3 of Fig. 2;

Fig. 4 is a sectional elevational view on the line 4—4 of Fig. 2; and

Fig. 5 is a view similar to Fig. 2 with the parts in a different relation.

Referring now to the drawings more in detail the invention will be fully described.

As it has been previously stated the operating mechanism of the invention is adapted for broad application but for purposes of disclosure it is shown in connection with the valve of Fig. 1. In Fig. 1 a valve body 2 has ports 4 and 6 and to the upper side of the body there is secured in any suitable manner, as by bolts, a cap 8 which may carry a housing 10 provided with a closure 11. The support or housing preferably contains and supports the operating mechanism.

A cone plug 12 has a passageway 14 therethrough and the said plug is adapted to be rotated between open and closed positions and to be reciprocated axially up and down between seated and non-seated positions. The cone plug may be journalled or pivoted for the aforesaid movements in the lower part of the body and in the cap, and a stem or spindle structure 16 extending upwardly therefrom and indicated by 16 is provided. A central hub part 18 of the cap 8 has associated therewith a stuffing box construction for the stem or spindle of the plug which may consist of a gland 20 and packing, as shown. Seats 22 and 24 of the plug and body are arranged for cooperative engagement so that the plug may be suitably seated in the body when in open or closed position.

As previously described when the plug is operated it is desired that it be moved axially from seated relation, rotated from closed to open position or vice versa and then moved downwardly or reseated. It is to accomplish these movements that the novel features of the invention are directed and it will be understood that the plug may be arranged by reversing the taper, so that it is moved downwardly for unseating and upwardly for seating.

A lever 30 which may be called a rotating lever is secured to the spindle 16 (see Fig. 2) and in the operation of the mechanism shown said lever 30 swings from the position in Fig. 2 in a clockwise direction to substantially the dot-dash line position and the full line position shown in Fig. 5. The swinging of the lever 30 back and forth rotates the cone plug 12 between its open and closed positions. For clearness it will be assumed that the lever 30 in the full line position of Fig. 2 is in the closed position of the plug.

An operating member 32 is provided which may take the form of a rod. As shown the rod moves in a straight line and for that purpose it is suitably guided in some manner as by a bearing 34. There may be nuts not shown in screw threaded engagement with the rod at opposite sides of a member 60 in which the end of rod 32 is disposed. The rod 32 may be reciprocated in any desired manner as by a piston associated with a cylinder, rack and pinion, or in any other desired manner.

Otherwise, the rod 32 may be in screw threaded engagement with member 60 and rotated to act on said member.

A lever 34 having upper and lower arms 36 and 38 is pivoted by aligned pivots 40 associated with an upper plate 42 and a part 44 associated with the support 10.

A roll 44 is carried between the arms of lever 34 and operates in a slot of lever 30 which is indicated generally by 45. As will appear lever 34 actuates lever 30.

A link 46 having upper and lower parts 48 and 50 is pivoted at 52 to a block 54 that is slidable in a guideway 56 of a guide member 58. Said member 58 is fixed to a part 57 of the support 10 in any suitable manner and the guide is arranged so the pivotal connection 52 moves towards and away from pivot 40. The connection 52 may be otherwise arranged to move towards and away from pivot 40.

The cylindrical member 60 is oscillatable in the outer ends of the arms of link 46. As the rod 32 reciprocates in or when it reciprocates to act on member 60, the lever 46 is oscillated thereby. Arms 36 and 38 of lever 34 receive therebetween the lever 46 and the said arms are pivoted at 62 for relative movements. As the rod 32 moves the member 60 outwardly from the position shown, and which position may be the plug closed position, the lever 46 is swung clockwise so that lever 34 is swung counterclockwise whereby roll 44 of lever 34 traverses slot 45 of lever 30 and causes the said lever 30 to swing clockwise for rotating the spindle and plug, the plug open position of lever being substantially as shown by dot-dash lines in Fig. 2 and full lines in Fig. 5.

Means for moving the cone plug axially between its seated and non-seated positions will now be described.

The upper end of the cone plug spindle 16 is provided with a screw thread or threads 70 and a plate member 72 has a hub part rotatable in a bearing 74' of a plate 76 which is fixed to the support 10, as shown. A collar 78 on the lower end of the plate hub and said hub are such that they act as a nut on the spindle so that as the plate 72 is oscillated or rotated the spindle and plug are moved axially in one direction or the other according to the direction of oscillation of the member 72. In other words the plug is moved from seated position and reseated by rotative movements of member 72. A plate 74 adjacent plate 72 is provided for rotating said plate and it as well as the plate 72 have extensions or arms 80 and 82 as shown in Fig. 2. An adjusting screw 84 is connected to extension 80 at 86 and is threaded as shown. A block 88 slidably receives the screw 84 and is connected at 90 to the extension 82 while nuts 92 are provided on the screw by the means of which the plates 72 and 74 may be adjusted angularly relative to one another. The plates may be held in adjusted relation by any suitable means such as a clamp screw or bolt 75.

For rotating plates 72 and 74 plate 74 is connected to one of the moving members. A link 94 pivotally connecting said plate with lever 34, as shown, serves to impart rotation to the plate 74 and nut mechanism. As lever 34 swings counterclockwise from the position shown in Fig. 2, to plug open position the plate 74 is oscillated counterclockwise and then clockwise. In this way the nut mechanism causes the spindle and plug to be elevated and lowered to bring about movements of the plug from seated to non-seated position and then to reseat the said plug. While, however, the plug is being moved from off its seat and onto its seat again by movements of lever 34, the plug is held against rotation. It is desired that the plug be moved directly from off and onto its seat without rotation in order not to injure the cooperating seats and to insure the proper seating relation of the plug and body and means to accomplish that will now be described.

An outer portion of the slot 45 of lever 30 is formed with a dwell such as 47, so that in the initial movement of lever 34 from the position shown in Fig. 2 the rotating lever 30 is not rotated. While roll 44 is traversing the dwell 47 rotative movement is imparted to member 74 to move the plug axially to unseat it. When the said roll passes off the dwell of the slot the lever 30 is swung clockwise by lever 34 to rotate the plug. Another dwell portion 49 of the slot is provided and when the lever 30 has swung to the open position of the cone plug the roll 44 of lever 34 is positioned at the inner end of said dwell indicated by dot-dash lines 44' in Fig. 5 as shown.

The dwell 49 is so arranged that as roll 44 travels thereover the lever 30 is held against rotation and during this movement of lever 34 the member 74 is swung clockwise so that the nut mechanism lowers the spindle to reseat the cone plug.

In operation when it is desired to rotate the plug from closed to open position the rod 32 is moved outwardly from the position shown in Fig. 2 to bring about counterclockwise movement of lever 34. As stated during the initial movement of lever 34 the roll 44 traverses the dwell 47 of the lever 30 so that the lever 30 is held against rotation. The connection of the lever 34 and plate 74 causes both plates 72 and 74 to move counterclockwise during the initial movement of lever 34 so that by means of the nut construction and threaded spindle the said spindle is elevated to unseat the plug.

As the roll 44 of lever 34 passes off the dwell portion 47 of the lever 30, said lever 30 is swung clockwise by lever 34 to the open position of the cone plug shown in dot-dash lines in Fig. 2 and full lines in Fig. 5. During the latter movement of lever 34 and while roll 44 is traversing the dwell portion 49 of the slot of lever 30, the said lever 30 is held against rotation and member 94 swings plate 74 to bring about reseating of the plug.

When it is desired to rotate the plug from open position to closed position rod 32 is moved inwardly to swing line 46 counterclockwise and lever 34 clockwise. The initial movement of lever 34 in a counterclockwise direction holds lever 30 against movement since roll 44 first traverses dwell 49 of lever 30 but during this movement member 74 is rotated counterclockwise to unseat the plug. When the roll 44 leaves the dwell 49 as lever 34 continues to rotate clockwise the said roll traverses the slot of lever 30 to swing it counterclockwise to the full line plug closed position in Fig. 2. When said lever 30 is in closed position of the plug the roll 44 is at the start of the dwell 47 and while the lever 34 travels clockwise to the end of its movement the roll 44 traverses the dwell and lever 34 through link 34 rotates plate 74 and the nut mechanism so as to move the stem and plug axially reseating the plug in the body.

It will be obvious from the foregoing that the operating mechanism is characterized by a straight line movement and is constructed and arranged in such a way that the plug is first moved axially or is unseated and then rotated and finally reseated again there being no rotative movement of the plug while it is being unseated or reseated. This is all to the end that the mechanism operates with efficiency. The plug must be moved axially into seated position to provide a tight seal between the cooperating seats of the plug and body. To insure proper seating and overcome strains and stresses by improper seating the screw 84 and associated parts facilitates the necessary angular adjustment of the plates 72 and 74.

The mechanism is characterized by its simplicity and efficiency in operation thereby facilitating economy in manufacture and maintenance. This is accounted for in part at least by lever 30 which is arranged so that as lever 34 swings for instance from the position shown there is a dwell, slow rotation, rotates on a reverse curve, final rotation and a final dwell.

Various changes and modifications may be made without departing from the spirit and scope of the invention and therefore it is desired to be limited, if at all, by the appended claims rather than the foregoing description.

What I desire to claim and secure by Letters Patent of the United States is:

1. Operating mechanism for a valve or the like having a spindle adapted for reciprocation and rotation comprising, a rotating lever secured to said spindle, a rotatable nut mechanism threadedly engaging said spindle, an operating member movable in a straight line, operative connections between the operating member, rotating lever and nut mechanism adapted and arranged whereby the latter is actuated by the former and during the initial and final movements thereof said rotating lever is held against rotation while said nut mechanism is operated to reciprocate said spindle without rotation thereof and intermediate which it is rotated.

2. Operating mechanism for a valve or the like having a spindle adapted for reciprocation and rotation comprising, a rotating lever secured to said spindle, a rotatable nut mechanism threadedly engaging said spindle, an operating member movable in a straight line, operative connections between the operating member, rotating lever and nut mechanism adapted and arranged whereby the latter is actuated by the former and during the initial and final movements thereof said rotating lever is held against rotation while said nut mechanism is operated to reciprocate said spindle without rotation thereof and intermediate which it is rotated, the said connections including a lever having a member operable in a slot provided in said rotating lever which has dwell portions adjacent opposite ends, and a member connecting said lever and said nut mechanism.

3. Operating mechanism for a valve or the like having a spindle adapted for reciprocation and rotation comprising, a rotating lever secured to said spindle, a rotatable nut mechanism threadedly engaging said spindle, an operating member movable in a straight line, operative connections between the operating member, rotating lever and nut mechanism adapted and arranged whereby the latter is actuated by the former and during the initial and final movements thereof said rotating lever is held against rotation while said nut mechanism is operated to reciprocate said spindle without rotation thereof and intermediate which it is rotated, said connections including a lever pivoted to said operating member at one end and at its other end to said support, a second lever pivoted to said support and to said first named lever and having a part for traversing a slot provided in said operating member, and said slot provided with dwell portions adjacent opposite ends thereof.

4. Operating mechanism for a valve or the like having a spindle adapted for reciprocation and rotation comprising, a rotating lever secured to said spindle, rotatable nut mechanism threadedly engaging said spindle, an operating member movable in a straight line, operative connections between said operating member, rotating lever and nut mechanism adapted and arranged whereby the latter is actuated by the former and during the initial and final movements thereof said rotating lever is held against rotation while said nut mechanism is operated to reciprocate said spindle without rotation thereof and intermediate which it is rotated, said connections including a lever pivoted to said operating member at one end and at its other end to said support, a second lever pivoted to said support and to said first named lever and having a part for traversing a slot provided in said operating member, the said slot provided with dwell portions adjacent opposite ends thereof and the pivotal connection of the first named lever and support being shiftable in a straight line.

5. Operating mechanism for a valve or the like having a spindle adapted for reciprocation and rotation comprising, a rotating lever secured to said spindle, an operating member movable in a straight line, operative connections between said operating member, rotating lever and nut mechanism adapted and arranged whereby the latter is actuated by the former and during the initial and final movements thereof said rotating lever is held against rotation while said nut mechanism is operated to reciprocate said spindle without rotation thereof and intermediate which it is rotated, said connections including a lever pivoted to said operating member at one end and at its other end to said support, a second lever pivoted to said support and to said first-named lever and having a part for traversing a slot provided in said operating member, the said slot provided with dwell portions adjacent opposite ends thereof and the pivotal connection of the first-named lever and support being shiftable in a straight line in a direction opposed to the direction of movement of the operating member.

6. Operating mechanism for a valve adapted for reciprocation and rotation comprising, a rotating lever secured to said spindle, a rotatable nut mechanism threadedly engaging said spindle, an operating member reciprocable in a straight line, a lever pivoted at one end to said operating member and at its other end to a member guided for straight line movements relative to the operating member, a second lever pivoted intermediate its ends to said support and at one end intermediate the ends of the first-named lever, the rotating lever provided with a slot having dwell portions adjacent opposite ends receiving a part on the other end of the second named lever, and connections between said nut mechanism and a certain one of said levers.

7. Operating mechanism for a valve or the like having a spindle adapted for reciprocation and rotation comprising, a support, a rotating lever secured to said spindle, a rotatable nut mechanism threadedly engaging said spindle, an operating member reciprocable in a straight line, a lever pivoted at one end to said operating member and at its other end to a member guided for straight line movements relative to said operating member, a second lever pivoted intermediate its ends to said support and at one end intermediate the ends of the first-named lever, said rotating lever provided with a slot having dwell portions adjacent opposite ends receiving a part on the other end of the second named lever, and connections between said nut mechanism and the second-named lever.

8. Operating mechanism for a valve or the like having a spindle adapted for reciprocation and rotation comprising, rotatable screw means threadedly engaging said spindle, and actuating means for rotating said screw means operatively connected thereto, said screw means including a part threadedly engaging the spindle and a part angularly adjustable relative thereto.

9. Operating mechanism for a valve or the like having a spindle adapted for reciprocation and rotation movements comprising, rotatable screw means threadedly engaging said spindle, actuating means for rotating said screw means operatively connected thereto, said screw means including a part threadedly engaging said spindle and a part angularly adjustable relative thereto, and means to move said parts angularly relative to one another including a screw mechanism associated therewith.

10. Operating mechanism for a valve or the like having a spindle adapted for reciprocation and rotation comprising, rotatable screw means engaging said spindle, actuating means for rotating said screw means operatively connected thereto, said screw means including a plate-like member having screw thread connections with said spindle and a plate-like member movable angularly relative thereto connected to said actuating means, and means to hold the plate-like members against relative movement.

11. Operating mechanism for a valve or the like having a spindle adapted for reciprocation and rotation comprising, rotatable screw means engaging said spindle, actuating means for rotating said screw means operatively connected thereto, said screw means including a plate-like member and screw connections with said spindle and a plate-like member movable angularly relative thereto connected to said actuating means, and an adjusting screw associated with the plate-like members.

12. Operating mechanism for a valve or the like having a spindle adapted for reciprocation and rotation comprising, rotatable screw means engaging said spindle, actuating means for rotating said screw means operatively connected thereto, said screw means including a plate-like member and screw connections with said spindle and a plate-like member movable angularly relative thereto connected to said actuating means, an adjusting screw associated with the plate-like members, and means to hold said members against relative movement.

DAVID D. GOLDBERG.